United States Patent [19]

Kishi et al.

[11] Patent Number: 4,675,811
[45] Date of Patent: Jun. 23, 1987

[54] MULTI-PROCESSOR SYSTEM WITH HIERARCHY BUFFER STORAGES

[75] Inventors: Makoto Kishi, Kanagawa; Toshihisa Matsuo, Atsugi, both of Japan

[73] Assignee: Hitachi, Ltd., Tokyo, Japan

[21] Appl. No.: 686,693

[22] Filed: Dec. 27, 1984

[30] Foreign Application Priority Data

Dec. 27, 1983 [JP] Japan ............................. 58-248678

[51] Int. Cl.⁴ .............................................. G06F 13/00
[52] U.S. Cl. ................................................... 364/200
[58] Field of Search ... 364/200 MS File, 900 MS File, 364/300 MS File

[56] References Cited

U.S. PATENT DOCUMENTS

| | | | |
|---|---|---|---|
| 3,525,080 | 8/1970 | Couleur et al. | 364/200 |
| 3,618,040 | 11/1971 | Dwamoto et al. | 364/200 |
| 3,771,137 | 11/1973 | Barner et al. | 364/200 |
| 4,056,844 | 11/1977 | Szumi | 364/200 |
| 4,086,629 | 4/1978 | Desyllas et al. | 364/200 |
| 4,253,144 | 2/1981 | Bellamy et al. | 364/200 |
| 4,400,770 | 8/1983 | Chan et al. | 364/200 |
| 4,463,424 | 7/1984 | Mattson et al. | 364/200 |
| 4,484,267 | 11/1984 | Fletcher | 364/200 |

Primary Examiner—Archie E. Williams
Assistant Examiner—William G. Niessen
Attorney, Agent, or Firm—Antonelli, Terry & Wands

[57] ABSTRACT

A multi-processor system includes a main storage and buffer storages of multi-layered hierarchy, which share the main storage. A plurality of storage controllers, each of which contains a first buffer storage, are connected with the main storage and at least one processor containing a second buffer storage is connected with each of said storage controllers. The directory of the first buffer storage contains an exclusive bit indicating whether the data existing in the first buffer storage are only one copy from the main storage or not and thus reduces the repetition of requests for the data coincidence control between different storage controllers. Each of said storage controllers contains a directory having the same content as that of the directory of the second buffer storage of the associated processor and effects the data coincidence control between different processors for store request produced in the processors.

6 Claims, 6 Drawing Figures

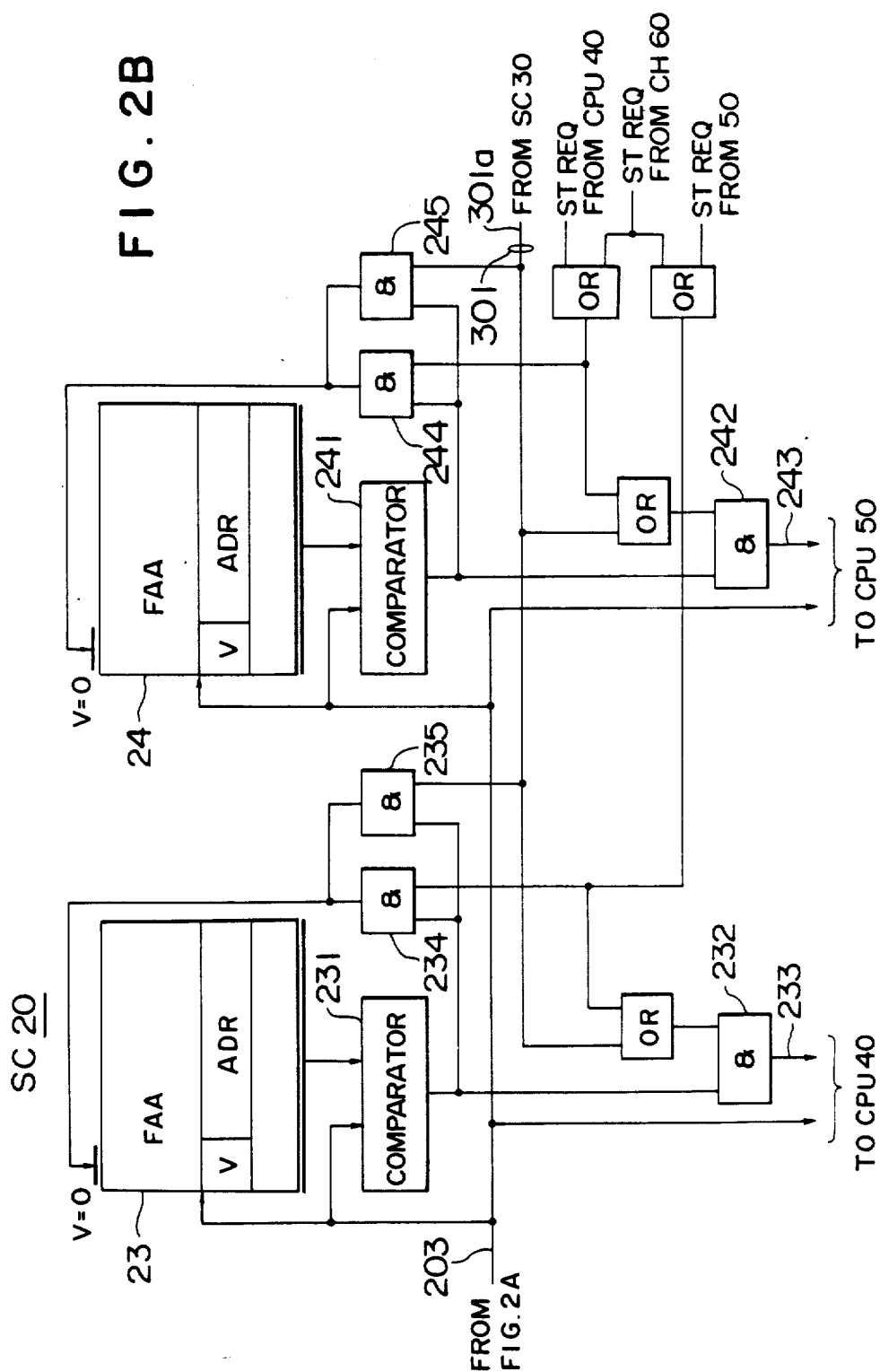

MULTI-PROCESSOR SYSTEM WITH HIERARCHY BUFFER STORAGES

BACKGROUND OF THE INVENTION

This invention relates to a multi-processor system with hierarchy buffer storages, and particularly to a multi-processor system of a hierarchy storage structure having a main storage and two- or more-layered hierarchy buffer storages, wherein there exists a plurality of buffer storages in each layer.

In a multi-processor system in which a plurality of processors, each of which has a buffer storage, share a main storage, it is required that the coincidence between data in the main storage and those in each of the buffer storages is guaranteed and that all of the buffer storages utilize the newest data. In U.S. Pat. No. 3,618,040 and Japanese Patent Kokoku Publication No. 12020/1974 it is disclosed that when a certain processor stores new data in its buffer storage and/or main storage, it transmits the address of the store to the other processors to invalidate the data stored in the buffer storage of the other processors and thus the coincidence between the data stored in the main storage and those stored in each of the buffer storages is guaranteed.

U.S. Pat. No. 4,056,844 discloses a memory control system having two buffer address arrays BAA-1 and BAA-2 storing identical contents as a directory of the buffer storage. In this case, when a store operation has been effected in the storage of each of the processors, it is necessary to examine by means of one of the buffer address arrays whether the data of the address transmitted by another processor is held or not. For this reason, in each of the processors, access to the buffer storage is prevented by the store operation in the other processors. The U.S. Patent mentioned above discloses that BAA-1 is used as a directory for access to the buffer storage and BAA-2 is used for invalidation process by the address transmitted by the other processor.

The U.S. Pat. No. 4,056,844 discloses that the directory of the private storage (buffer storage) contains a fetch only bit (F bit). When the F bit is in the binary "0" state, this indicates that the specified buffer storage has only one copy of a data block from the shared main storage. When the F bit is in the binary "1" state, this indicates that one of the other processors has transmitted the same data block from the shared main storage to the buffer storage at a certain point of time. According to this U.S. Patent, the processor, which has stored new data, does not transmit the store address to the other processors and in this way it is possible to reduce the hindrance of access to the buffer storage in the other processors.

All the prior art techniques described above disclose systems having a single-layered buffer storage and no system with buffer storages of two- or more-layered hierarchy is considered.

SUMMARY OF THE INVENTION

The object of this invention is to provide a multi-processor system, by which in a system having two- or more-layered buffer storages the correspondence between data stored in different buffer storages is guaranteed.

A multi-processor system according to this invention comprises a shared storage for storing data, a plurality of storage controllers, each of the storage controllers having a first buffer storage for storing data transmitted by said shared storage and a first directory, and a plurality of processors, each of the processors being connected to either one of said storage controllers. Each of the processors comprises a second buffer storage and a second directory. Each of the storage controllers comprises a third directory storing the same content as that stored in the second directory of the processor with which it is related. The first directory contains an exclusive bit indicating whether the data existing in the first buffer storage is only one copy from the shared storage or not. Each of the storage controllers demands the data coincidence control to the other storage controllers, responding to the store request from the processor with which it is related, only when the exclusive bit of the first directory corresponding to the data of the first buffer storage, to which the store is requested, shows that it is not only one copy. The other storage controllers effect an invalidation process at the first and third directories, responding to the data coincidence control demand. Furthermore, the other storage controllers demand an invalidation process to the secon directory of the processors to which this third directory is related, responding to the invalidation process at the third directory.

BRIEF DESCRIPTION OF THE DRAWINGS

FIGS. 2A and 2B are block diagrams indicating examples of the concrete construction of the storage controller shown in FIG. 1;

DESCRIPTION OF THE PREFERRED EMBODIMENTS

Figure 1:
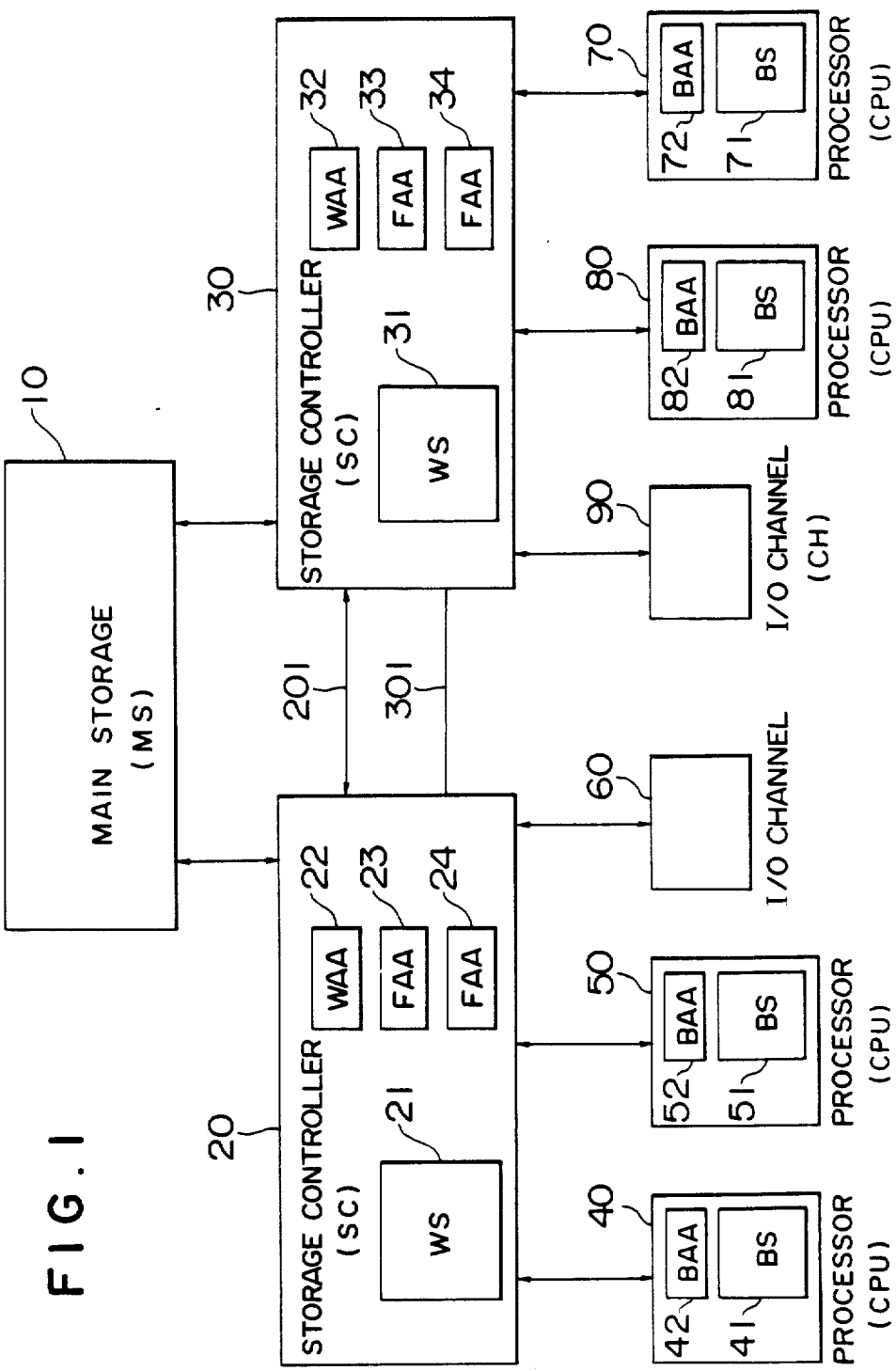
FIG. 1 is a block diagram showing an embodiment of this invention.

FIG. 1 is a block diagram showing an embodiment of this invention. In FIG. 1, a plurality of storage controllers SC are connected to the main storage MS 10 as a shared storage. In FIG. 1, SC 20 and 30 are connected to MS 10. To SC 20 are connected two processors CPU 40, 50 and an input-output channel CH 60, the number of CPUs connected to SC 20 may be one or more. To SC 20 are connected two CPU 70, 50 and CH 90. Similarly CPU connected to SC 30 may be one or more. CPU 40, 50, 70 and 80 contain private buffer storages BS 41, 51, 71 and 81 as well as buffer address arrays BAA 42, 52, 72 and 82 as directories of the BS, respectively. SC 20 and 30 contain intermediate buffer storages WS 21 and 31 as well as buffer address arrays WAA 22 and 32 as directories of the WS, respectively. SC 20 contains further address arrays FAA 23, 24 having the same contents as BAA 42, 52 which are in CPU 40, 50, respectively, connected to SC 20. The content contained by FAA 23 is identical to that contained by BAA 42 and the content contained by FAA 24 is identical to that contained by BAA 52. Further, SC 30 contains FAA 33, 34 having the same contents as BAA 72, 82 which are in CPU 70, 80, respectively, connected to SC 30. The contents contained by FAA 33 is identical to that contained by BAA 72 and the content contained by FAA 34 is identical to that contained by BAA 82.

Figure 3:
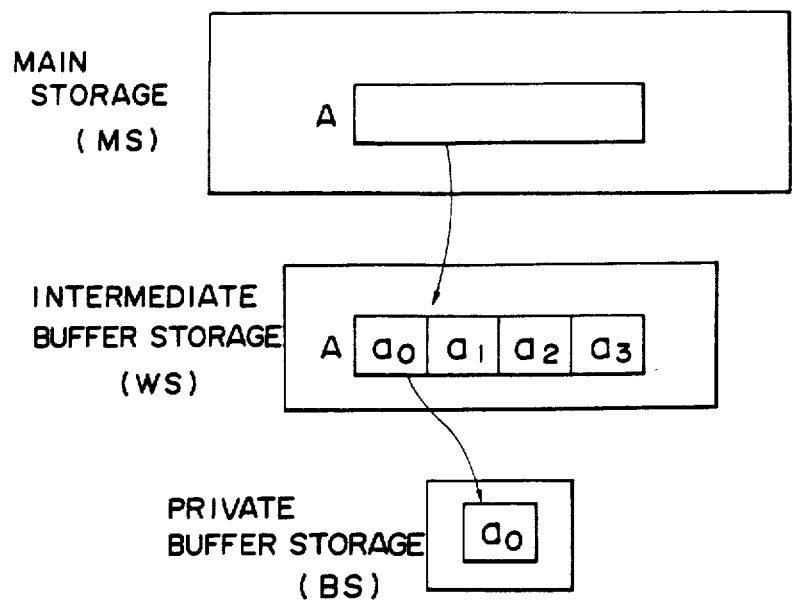
FIG. 3 is a scheme for explaining a data unit transmitted among the main storage, an intermediate buffer storage and a private buffer storage.

In the system indicated in FIG. 1 the transmission from WS to BS is effected by a block of data (e.g. 64 bytes) and that from MS to WS is effected by one or more blocks, i.e., a so-called line. In this embodiment it is supposed that a line consists of 256 bytes constituting 4 blocks. As indicated in FIG. 3, when a certain CPU tries to read out data contained in a block $a_0$, if this block does not exist in its BS, it accesses the WS of higher rank and takes the block $a_0$ into its BS. At this time, in the case where there is no line A containing the block $a_0$ in the WS, SC accesses MS and reads out the line A from MS to take it into its WS. At the same time it transmits the block $a_0$ to BS.

In the multi-layered storage system, BS adopts the store-through method as a store operation and WS adopts the store-in method. According to the store-through method data is stored in the BS and at the same time in the WS. According to the store-in method it is stored in the BS but not stored in the MS and it is returned to the MS, when it is replaced.

Figure 4A:
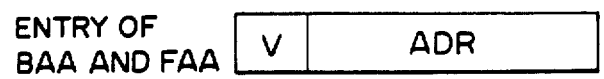
FIG. 4A is a scheme showing a content of one entry of the directory of the buffer storage.

FIG. 4A indicates the content of one entry of each BAA. Each entry of the BAA corresponds to a block of the BS in a one to one relationship and consists of an address part (ADR) indicating data of which address in MS is the corresponding block of the BS and a V bit indicating the efficiency of the entry. Each entry of FAA is similar.

Figure 4B:
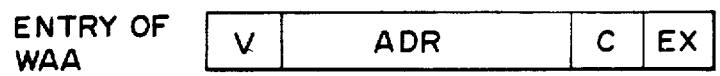
FIG. 4B is a scheme showing a content of one entry of the directory of the intermediate buffer storage.

FIG. 4B indicates the content of one entry of each WAA. Each entry of the WAA corresponds to a line of the WS in a one to one relationship and consists of an address part (ADR) indicating data of which address in the MS is the corresponding line of the WS, a change (C) bit indicating whether a rewrite has been done or not after the corresponding line of the WS has been taken into the WS, and exclusive (EX) bit indicating whether the corresponding line of the WS exists only in that WS or not, and a V bit indicating the efficiency of the entry. When the C bit is in the binary "1" state, this means that the content of the line has been changed by a store operation of a related CPU while remaining in the WS. To the contrary, when it is in the binary "0" state, this means that the content of the line has not been changed. When the EX bit is in the binary "1" state, this means that the line does not exist in the other WSs, but it exists only in that WS. To the contrary, when the EX bit is in the binary "0" state, this means that the line exists also in other WSs.

Figure 2A:
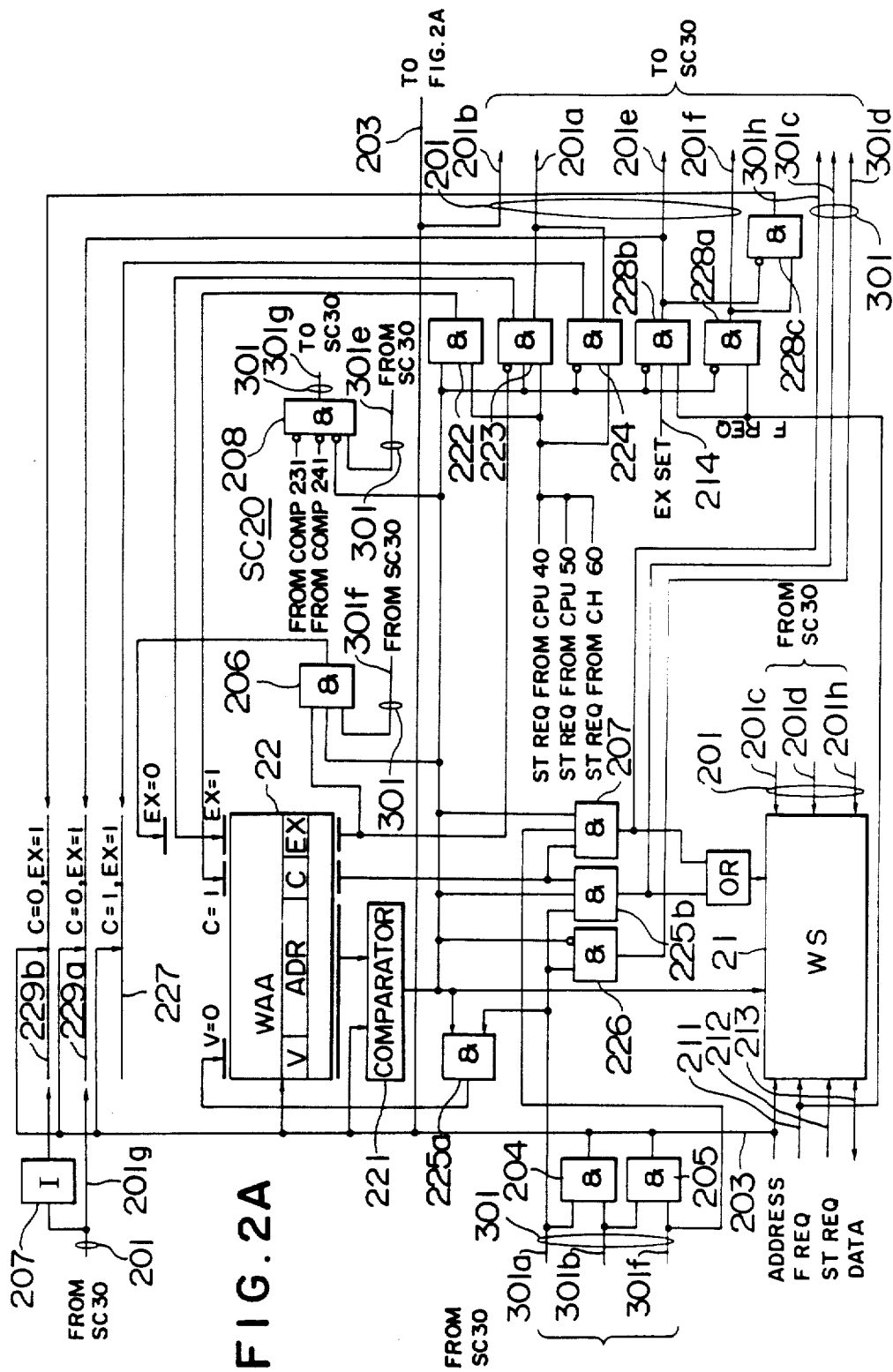

FIGS. 2A and 2B show a concrete example of the SC 20. FIG. 2A is directed to WAA 22 and FIG. 2B is directed to FAA 23, 24. The SC 30 has also the same construction. In FIGS. 2A and 2B, are shown representatively WS 21, WAA 22, FAA 23 and 24 indicated in FIG. 1 and the contents of one entry indicated in FIGS. 4A and 4B. In the ADR of each entry of the WAA 22 is set the address in the MS, corresponding to each line held in the WS 21. In each entry of the FAA is set the same content as that of the each entry of BAA 42 and in each entry of the FAA 24 is set the same content as that of each entry of the BAA 52 of CPU 50.

The address, which requests a store in or fetch from the CPU 40, 50 and CH 60, is given to a line 203 and fetches one entry corresponding to a part of the bits of the address from the WAA 22. To the comparator 221 are inputted the ADR part and V bit from WAA 22 and the bits other than the bit which has accessed the WAA of the address in the line 203. The comparator 204 outputs a binary "1", when the V bit is "1" and both the addresses are in coincidence, and indicates that the line containing the requested data exists in the WS 21 (In WS). Further the comparator 221 outputs a binary "0", when the V bit is "0" or the two addresses are not in coincidence, and indicates that the line containing the requested data does not exist in the WS 21 (Not-in WS). The output of the comparator 221 is given to the WS 21, and at In WS, store in the WS 21 or fetch from WS 21 is effected. To WS 21 are given the address on the line 203, Fetch Request (F REQ) on the line 211, and Store Request (ST REQ) on the line 212. Data is carried on the line 213. The address to the WS 21, the F REQ and the ST REQ are given by the CPU 40, 50 and CH 60. However, these selection circuits taking information from them are well known and not shown in the figures. Further the data line 213 is connected with MS 10, CPU 40, 50 and CH 60, but the circuits therefor are also omitted. At Not-in WS, the line containing the requested data is transmitted from the MS 10 through the line 213 to the WS 21 and further an address, etc. is set at the corresponding entry in the WAA 22. The address of the line 203 is also given to the FAA 23 and 24 and one entry is fetched therefrom respectively. The comparator 231 compares the address read out from the FAA 23 with the address given by the line 203 and outputs a binary "1", when the V bit is "1" and they are in coincidence. In this state, since the FAA 23 is identical to the content of the BAA 42 in the CPU 40, it is meant that the block containing the data of the address indicated by the line 203 exists in the BS 41 in the CPU 40. The AND gate 232 commands an invalidation process through the line 233 to the CPU 40, when a coincidence output is obtained from the comparator 231 and the output of the CPU 50 or CH 60 is ST REQ. At the same time the AND gate is opened, making the V bit of the one entry stated above "0", and an invalidation process is effected also on FAA 23. The same operation is performed at the FAA 24 side. However FAA 24 responds to ST REQ from the CPU 40 or CH 60, because it is identical to the content of the BAA 52 in the CPU 50.

Next is explained the case where ST REQ for the data in the block $a_0$ of the line A has been given to the SC 20 by the CPU 40 connected to the SC 20. When the comparator 221 indicates In WS, ST REQ is treated on WS 21 and the data in the block $a_0$ of the line A on WS 21 is rewritten. Further the AND gate 222 is opened, making the C bit "1". In addition, in the case where, for the data coincidence guaranty for the BS 51 in the CPU 50, as a result of a search of the FAA 24, it is shown that the block $a_0$ is registered in the FAA 24, the output of the AND gate 244 invalidates the entry of the FAA 24 and at the same time requests through the output line 243 of the AND gate 242 to the CPU 50 to invalidate said block. When said block is not registered in the FAA 24, the AND gate 242 is not opened and the invalidation demand to the CPU 50 is not outputted.

The data coincidence control for the WS 31 of the SCs other than SC 30 and BS 71, 81 of CPU 70, 80 connected to said SC 30 is different, depending on the value of the EX bit of the entry registered on the line A of the WAA 22 in the SC 20. When the EX bit is "1", since the line A does not exist in the WS 31 of the SCs other than SC 30 and in BS 71, 81 of CPU 70, 80 connected to said SC 30, the AND gate 223 is not opened and does not energize the interface line 201a for the SCs other than SC 30. In the case where the EX bit is "0", it is possible that the line A exists in WS 31 of the SCs other than SC 30 and that a block in the line A (either one of $a_0$, $a_1$, $a_2$ and $a_3$) exists in BS 71, 81 of CPU 70, 80, and the AND gate 223 is opened, energizes the interface line 201a, and demands the data coincidence control. To the SCs other than SC 30 is transmitted the address stored through the interface line 201b. SC 30 effects the data coincidence control, based on the request of the interface line 201a. In SC 20, since an invalidation process is effected in the SCs other than SC 30, the output of the AND gate 223 sets the EX bit of said entry to "1".

The working mode of SC 30 for the data coincidence process is explained below, replacing SC 20 in FIG. 2 by it. The interface line demanding the data coincidence control from SC 30 to SC 20 corresponding to the interface line 201a from SC 20 to SC 30 is 301a and the interface line corresponding to the interface line 201b for the address is 301b. Now, when a data coincidence process request is given by the SC 30 to the interface line 301a, the AND gate 204 is opened and the address of the line 301b is given to FAA 23, 24 and WAA 22. Although the output of the AND gate 204 is connected with the address line 203 in FIG. 2, it is also possible that it is selected by a selection circuit described above but not shown in the figures together with the address given by the CPU 40, 50 and CH 60. The WAA 22 fetches the content of one entry specified by the address given through the line 301b. The comparator 221 compares the ADR part thus fetched with the give address. The AND gate 225a is opened by receiving a concidence output (binary "1") from the comparator 221, sets the V bit of said entry in WAA 22 to "0", and invalidates the line. In this way, corresponding to the store at the SC 30 side, the same line existing at the SC 20 side is invalidated. The AND gate 225b energizes WS 21, responding to the coincidence output from the comparator 221 and to the fact that the C bit is "1", and line-outs said line containing modified data existing in WS 21 to MS 10. At the same time it indicates that the line which has been modified through the interface line 301c by SC 30 exists in WS 21 and that said line has been transmitted to MS 10. When said line does not exist in WS 21, the AND gate 226 is opened, outputs a binary "1" to the interface line 301d, and informs SC 30 that said line does not exist in WS 21. The FAA 23 and 24 search all of the blocks ($a_0$–$a_3$) in the line A indicated by the addresses thus received and when they are registered, the AND gate 235 and 245 are opened, setting the V bit of said entry to "0". At the same time the AND gates 232 and 242 are opened, and demand an invalidation process to CPU 40 and 50. In this manner the data of the line A disappear in BS 41, 51.

In the following is explained the case where ST REQ for the data in the block $a_0$ of the line A from the CPU 40 is given the SC 20 and the line A is not registered in the WS 21. In SC 20, the AND gate 224 is opened and demands through the interface line 201a the data coincidence control from the SC 30. The working mode of the SC 30 responding to this data coincidence control demand is the same as that described previously. The SC 20 outputs a fetch request for the line A to the MS 10 and intercepts the store operation to the WS 21. To the WS 21 are extended lines 201c and 201d corresponding to the lines 301c and 301d of SC 20 and the WS 21 stores the line A read out from the MS 10 and effects a store operation for ST REQ from the CPU 40. When the line 201c is "0" and the line 201d is "1", it is shown that the line A does not exist in the WS 31 of the SC 30 or that, although it exists therein, it has not been modified in the WS 31, and the WS 21 stores the line A in the MS 10. When the line 201c is "1", this means that a line A has been modified in the WS 1, and as indicated above, the line A line-outed by WS 31 is received from the MS 10 and stored. In the WAA 22 the gate 227 is energized by the output of the AND gate 224 and the address of the line A is registered in the ADR part of said entry. At the same time all of the V bit, C bit and E bit of said entry are set to "1".

In the above the case of ST REQ has been explained. The setting of the EX bit to "1" can be effected only by the operation of ST REQ, as stated above, but also in the operation of F REQ some effects can be obtained by the setting of the EX bit. In the concrete example shown in FIG. 2, the EX bit is set in the operation F REQ. As data on the storages there are instruction words and operands. Consequently, as for operands, in the case where there is a possibility to rewrite data after having read out the data of a line, the EX bit is set, when the line is fetched from the MS to the WS.

In the case where F REQ for the line is produced in CPU 40, if said data exists in BS 41, since they are treated in BS 41, there is no request to SC 201. If said data does not exist in BS 41, F REQ is given from CPU 40 to the line 211, the fetch address is given to the line 203 and in the case of F REQ of EX set, a signal indicating this is given to the AND gate 228b. In the case where said line is registered in the WS 21, the SC 20 reads out a requested block on said line A, e.g. $a_0$, from WS 21, transmits it to CPU 40, and does not set the EX bit. In the case where the line A does not exist in the WS 21, the AND gate 228a is opened, and further for F REQ of EX set also the AND gate 228b is opened and inquires through the lines 201e and 201f whether said line A exists after having been rewritten in the WS 31 of the SCs other than SC 30. The lines from SC 30 to SC 20 corresponding to the lines 201e, 201f from SC 20 to SC 30 are 301e, 301f. Hereinbelow the operation mode of SC 30 is explained, replacing it by the operation of SC 20 indicted in FIG. 2. The AND gate 205 is opened by a signal of the line 301f and the address of the line 301b is given to WAA 22, FAA 23 and 24. If said address is registered in the WAA and the EX bit is "1", the AND gate 206 is opened and the EX bit is set to "0". Further, when the C bit is "1", the AND gate 207 is opened and instructs to line-out the line A to the WS 21. In addition, the output of the AND gate 207 is transmitted through the line 301h to the SC 30. Furthermore to the AND gate 208 are given the output of the comparator for WAA 22, FAA 23 and 24 and a signal of the line 301e from SC 30 and the gate informs SC 30 through the line 301g that no one of WAA 22, FAA 23, 24 holds data fetched by the other SCs.

In SC 20, the line 201h from SC 30 is connected to WS 21. The line A line-outed by WS 31 in SC 30 is fetched from MS 10 and stored in WS 21. When the condition for the AND gate 228b is satisfied and the line 201g from SC 30 indicates "1", the address is registered by the gate 229a in WAA 22. The C bit is set to "0" and EX bit to "1". When the condition for the AND gate 228a is satisfied and that for the AND gate 228b is not satisfied, the AND gate 228c is opened. When the condition for the AND gate 228c is satisfied or the line 201g from SC 30 indicates "0", the address is registered by the gate 229b in WAA 22. The C bit is set to "0" and the EX bit to "0". The numeral 207 denotes an inverter.

In the example indicated in FIG. 2 the system is three-layered, as indicated by MS, WS and BS. However, the number of layers can be increased. Further, although the store-in method is adopted for the WS, the store-through method also may be used. In this case the control concerning the C bit is unnecessary.

According to this invention it is possible to reduce the repetition of operations of the interface between different SCs for the data coincidence control accompanied by the store operation between a plurality of WSs and BSs and the repetition of searches of the directory in the WS. In addition the data coincidence guaranty with the BS of a rank lower than the WS becomes possible.

What is claimed is:

1. Multi-processor system comprising:
   a shared storage for storing data;
   a plurality of storage controllers connected to said shared storage, each controller including a first buffer storage for storing data transmitted by said shared storage; and
   a plurality of processors, each of which is connected to an associated one of said storage controllers, each of said processors including a second buffer storage for holding data transmitted from said shared storage through said first buffer storage in said associated storage controller and a second directory for identifying the data stored in said second buffer storage for access to said second buffer storage;
   each of the storage controllers further comprises a first directory holding the address for identifying the data stored in the first buffer storage of that storage controller for access to said first buffer storage therein from an associated processor connected to the storage controller and a third directory for storing the same contents as the content stored in said second directory included in the associated processor, said first directory containing a plurality of entries, each entry containing an exclusive bit indicating whether the data existing in the corresponding first buffer storage is the only copy of the data from said shared storage which exists in any storage controller; and
   each of said storage controllers further comprises first means responsive to a store request from the associated processor for demanding data coincidence control to the the storage controllers, second means for transmitting the address accompanied by said store request only when the exclusive bit in an entry of the first directory relating to said first buffer storage, to which the store is requested, shows that it is not the only copy, third means responsive to a data coincidence control request and the address from the other storage controllers for invalidating the registration of said address in said first and third directories, and fourth means for demanding the invalidation of the address registration to the second directory of the processor relating to said third directory, in response to said address being registered in said third directory.

2. Multi-processor system according to claim 1, wherein each of said storage controllers further comprises fifth means for setting the indication of the exclusive bit of the first directory so as to show that it is the only copy, in response to said first means.

3. Multi-processor system according to claim 1, wherein said first buffer storage is operated in accordance with a store-in method and each entry of said first directory contains a change bit indicating whether the corresponding data of said first buffer storage has been modified or not while the corresponding data is held in said first buffer storage, and
   each of said storage controllers comprises fifth means responsive to the fact that data requested for an access from the associated processor is absent on said first buffer storage for checking whether modified data relating to said data is present or not in said first buffer storage of other storage controllers, and sixth means responsive to the checking by said fifth means of said other storage controllers for transmitting states of presence or absence of said data in said first buffer storage and of the change bit to said other storage controllers.

4. Multi-processor system according to claim 2, wherein said first buffer storage is operated in aaccordance with a store-in method and each entry of said first directory contains a change bit indicating whether the corresponding data of said first buffer storage has been modified or not while the corresponding data is held in said first buffer storage, and
   each of said storage controllers comprises sixth means responsive to the fact that data requested for an access for the associated processor is absent in said first buffer storage for checking whether modified data relating to said data is present or not in said first buffer storage of other storage controllers, and seventh means responsive to the checking by said fourth means of said other storage controllers for transmitting states of presence of absence of said data in said first buffer storage and of the change bit to said other storage controllers.

5. Multi-processor system according to claim 3, wherein the first buffer storage of each of said storage controllers comprises means for sending out to said shared storage the modified data relating to said data requested for access in response to said associated sixth means and for fetching from said shared storage said data requested for access in response to said sixth means of said other storage controllers.

6. Multi-processor system according to claim 4, wherein the first buffer storage of each of said storage controllers comprises means for sending out to said shared storage the modified data relating to said data requested for access in response to said associated seventh means and for fetching from said shared storage said data requested for access in response to said seventh means of said other storage controllers.

* * * * *